United States Patent [19]

Storch et al.

[11] Patent Number: 5,367,148
[45] Date of Patent: Nov. 22, 1994

[54] COUNTERFEIT DETECTION USING ID NUMBERS WITH AT LEAST ONE RANDOM PORTION

[75] Inventors: Leonard Storch; Ernst Van Haagen, both of New York, N.Y.

[73] Assignee: Cias, Inc., New York, N.Y.

[21] Appl. No.: 669,904

[22] Filed: Mar. 15, 1991

Related U.S. Application Data

[63] Continuation-in-part of Ser. No. 420,101, Oct. 11, 1989, and a continuation-in-part of Ser. No. 292,569, Dec. 30, 1988, which is a continuation-in-part of Ser. No. 853,745, Apr. 18, 1986, Pat. No. 4,814,589.

[51] Int. Cl.[5] .............................................. G06F 15/21
[52] U.S. Cl. .................................... 235/375; 283/901; 340/825.34
[58] Field of Search .................. 340/825.34; 235/375, 235/385; 283/901, 903, 904

[56] References Cited

U.S. PATENT DOCUMENTS

| | | |
|---|---|---|
| 3,034,643 | 5/1962 | Keller et al. . |
| 3,426,879 | 2/1969 | Walker . |
| 3,524,163 | 8/1970 | Weiss . |
| 3,829,661 | 8/1974 | Silverman et al. . |
| 3,833,795 | 9/1993 | Shoshani et al. .................. 101/72 |
| 3,890,599 | 6/1975 | Simjian .......................... 340/825.34 |
| 4,087,092 | 5/1978 | Krause et al. . |
| 4,139,219 | 2/1979 | Herndon ............................ 283/57 |
| 4,157,829 | 6/1979 | Goldman et al. . |
| 4,191,376 | 3/1980 | Goldman et al. ................. 235/385 |
| 4,193,061 | 3/1980 | Zoltai ............................ 340/825.34 |
| 4,207,814 | 6/1980 | Schenk ............................. 235/437 |
| 4,283,709 | 8/1981 | Lucero et al. ..................... 235/375 |
| 4,463,250 | 7/1984 | McNeight et al. ................. 235/385 |
| 4,480,177 | 10/1984 | Allen ............................. 235/379 |
| 4,506,914 | 3/1985 | Gobeli ............................. 283/70 |
| 4,514,815 | 4/1985 | Anderson ......................... 364/478 |
| 4,558,318 | 12/1985 | Katz et al. ....................... 235/375 |
| 4,605,846 | 8/1986 | Duret et al. ...................... 235/468 |
| 4,630,201 | 12/1986 | White ............................. 364/408 |
| 4,641,017 | 2/1987 | Lopata ............................ 235/457 |
| 4,677,604 | 6/1987 | Selby, III et al. ................. 369/33 |
| 4,837,425 | 6/1989 | Edwards .......................... 235/457 |
| 4,983,817 | 1/1991 | Dolash et al. .................... 235/462 |

FOREIGN PATENT DOCUMENTS

| | | | |
|---|---|---|---|
| 10496 | 4/1980 | European Pat. Off. | ....... 340/825.34 |
| 2237911 | 3/1973 | Germany | ............................ 194/206 |

OTHER PUBLICATIONS

"Appendix C" and paragraph 2.4 of the Invitation for Bid for Optical Bar Code Readers of the Massachusetts State Lottery Commission, dated Apr. 4, 1989.

*Primary Examiner*—John Shepperd
*Attorney, Agent, or Firm*—Rosen, Dainow & Jacobs

[57] ABSTRACT

Counterfeit objects, such as products or documents, can be detected by checking associated ID numbers, which include one or more appended fields of one or more randomly selected digits, in a database containing the correct authorized ID numbers. This use of random selection makes it impossible for counterfeiters to effectively predict or anticipate correct ID numbers. For example, by using bar coded ID numbers with two distinct appended fields of randomly selected numbers, instead of traditional serial numbers, counterfeit products can be conveniently and positively detected either on a wholesaler's or vendor's shelf using a truncated outside ID number found on the product's packaging, or, for example, upon receipt of a customer's product registration card on which the complete inside ID number is found, this complete inside ID number having been concealed from casual perusal during the product's distribution. If authorized ID numbers are repeated by counterfeiters, "hot" lists are formed and used for immediate detection of counterfeit.

11 Claims, 3 Drawing Sheets

Product Return Card

SRN 123456 23 17

Product Package

SRN 123456 23

Product Package

SRN 123456 23

0 98769 27009 3

COUNTERFEIT DETECTION USING ID NUMBERS WITH AT LEAST ONE RANDOM PORTION

This application is a continuation in part of copending application Ser. No. 07/420,101, filed Oct. 11, 1989, titled "OPTIMAL, ERROR-DETECTING, ERROR-CORRECTING AND OTHER CODING AND PROCESSING, PARTICULARLY FOR BAR CODES, AND APPLICATIONS THEREFOR SUCH AS COUNTERFEIT DETECTION," and this application is a continuation in part of copending application Ser. No. 292,569, filed Dec. 30, 1988, titled "INFORMATION TRANSFER AND USE, PARTICULARLY WITH RESPECT TO COUNTERFEIT DETECTION," which is a continuation of application Ser. No. 853,745, filed Apr. 18, 1986, now U.S. Pat. No. 4,814,589, titled "INFORMATION TRANSFER AND USE, PARTICULARLY WITH RESPECT TO OBJECTS SUCH AS GAMBLING CHIPS," the disclosures of all of which are incorporated herein by reference.

BACKGROUND OF THE INVENTION

The invention disclosed herein relates to counterfeit detection methods.

When an object, such as a product or document, is worth disproportionately more than the cost of its manufacture, it may be counterfeited at a profit. For example, manufacturers of proprietary products lose billions of dollars each year because their most successful products are often targeted by counterfeiters who produce spurious goods locally or overseas. When counterfeit goods are of similar or identical quality to the original, a manufacturer suffers from a continuous loss of sales as counterfeiting continues unchecked, because detection is difficult or impossible. Inferior counterfeit products may be more easily detected, but in addition to the above, they also jeopardize future sales of non-counterfeited products by marring reputation. In either case, the manufacturer's continuing level of untold lost profits due to counterfeit may be dramatic. Similar concerns arise with counterfeit documents.

A partial listing of products susceptible to being counterfeited includes: airplane parts; art; auto parts; baby products—formula, diapers, clothing; books; computers; computer peripherals; cosmetics; designer goods—clothing, shoes, eye glasses; electronics; entertainment recordings—CDs, records, audio and video cassettes; games-board, firmware, handheld; military parts; optics—binoculars, cameras; pharmaceuticals; software; tools; toys; watches.

Documents susceptible to fraud (including counterfeit) include: betting tickets (lottery, sports, etc); bonds (Treasury, commercial, etc); certificates (birth, gift, warranty, etc); checks (personal, commercial, travelers, etc); coupons; credit cards; currency; licenses (driver, business, import/export, etc); passports; scrip (store, amusement park, etc); stamps (postage, food, etc); stocks; tickets (concerts, sports, theater, etc); travel tickets (airline, commuter, etc), and so forth.

Staggering losses due to counterfeit are estimated. For example, the International Anti-Counterfeiting Coalition, IACC, located in Washington, D.C., fears annual losses of $100,000,000,000 (no mistake—one hundred billion dollars!). On Apr. 23, 1990, U.S. Attorney Stephen J. Markman reported the following to the IACC:

"In addition to safety, the economic loss from counterfeit products is enormous: The big three automakers estimate that they lose 240,000 jobs each year in the greater Detroit metropolitan area a/one due to counterfeiting of auto parts."

Two approaches for detecting counterfeit are: mechanical-based on conformity, and intellectual—based on uniqueness. These two counterfeit detection philosophies are based on fundamental underlying principles which are diametrically opposed to each other, conformity versus uniqueness.

Mechanical counterfeit detection techniques require physical examination and/or analysis of the object. The underlying principle here is conformity. Genuine objects are identical to each other while counterfeits must somehow be different. The difference between the genuine and fake must be discernible in order to detect counterfeit. For example, all U.S. currency is printed on special paper. Therefore, if a suspected bill's paper is discovered to be different, the bill is counterfeit.

Mechanical means alone cannot be relied upon. What one can make or print, another can as well. This creates inherent weaknesses. For example, some counterfeiters of U.S. currency have outwitted the special paper deterrent scheme described above by bleaching the ink off $1 bills and reusing the paper to print $100 bills, while other counterfeiters manufacture their own special paper which is sufficiently similar for their purposes.

Intellectual counterfeit detection and/or authentication techniques may; include signatures, numbers and/or other indicia for coding each genuine object differently. The underlying principle here is uniqueness. Each genuine object is individually signed, or assigned individual identifying information. Traditional ways to individually authenticate objects are: sign or assign.

One traditional way to authenticate certain objects, namely documents, is to sign them. Each person's signature is effectively different. Even though many may be named John Smith or Chun Lee, i.e., many have the same indistinguishable identifying name, respective signatures are different. Typically, fraud involving documents with individuals' signatures thereon is characterized as forgery, versus counterfeit.

For example, valid serial numbers may readily be anticipated and printed by counterfeiters using available numbering devices, while forging a signature is another matter. Blank checks, available at stationery stores, for example, may be authorized by John Smith's signature if he is known, or if that signature is verifiable, perhaps by comparison to other signed documents. Signatures, for example, bridge mechanical and intellectual techniques, involving examination-by-eye.

Applicants' anti-counterfeit techniques address mass produced objects, unsigned products and documents, manufactured to be essentially identical to each other-the only convenient and distinguishable difference among such essentially identical objects being the presence of associated identifying information, such as serial numbers.

Mr. Smith's signed check, mentioned above, may involve other variable information. For example, the dollar amount, the transaction date, payee information, Mr. Smith's address and bank account number, information about his bank, and so forth. Examples of other articles with variable parameters are: birth certificates, credit cards, lottery tickets, passports, etc.

Applicants' address how to detect counterfeit objects among essentially identical objects, objects that do not have individually and/or inherently variable parameters, objects such as mass produced products and documents, objects that may be readily identified only by their respective identifying information.

This is not to suggest that certain aspects of applicants' inventions may not be used beneficially in association with signed documents, for example, to augment the authentication afforded by the signature, for example.

Another traditional way to uniquely identify objects is to assign serial numbers, by counting, in a most convenient and orderly fashion. However, traditional serial numbers offer little obstacle to a counterfeiter because he can, for example, assign matching ascending and descending numbers given one correct serial number as a start, thereby duplicating authorized numbers only once. Even if two objects with matching serial numbers were found, thereby finding at least one counterfeit, mechanical techniques may still be required to tell which is counterfeit.

Also, counterfeiters could avoid following a pattern that may be helpful to pursuing authorities if the pattern were discovered. For example, rather than serially numbering their fakes, counterfeiters may randomly select numbering within a wide range of known-to-be valid numbers, so that the possibility of a particular consecutive narrow range of serial numbers being discovered by authorities as having been counterfeited is avoided, making the job most difficult for the authorities (albeit more difficult, but safer, for the counterfeiters as well).

According to described aspects of applicants' invention, intellectual coding techniques may also offer "self-checking" counterfeit detection schemes (serf-checking is a term used with error control coding, adopted for use by applicants when referring to certain intellectual anti-counterfeit coding techniques). Applicants define self-checking as follows: if a single read identifying number does not conform to a secret code, or match up in a database, it must be counterfeit.

The use of a secret algorithm is disclosed in McNeight et al's U.S. Pat. No. 4,463,250. MeNeight et at. provides objects with authorized ID numbers that conform to an algorithm or code, so that these ID numbers may be verified or tested for apparent authenticity using the same algorithm. The algorithm is cautiously deployed in locations where it is desirable to detect counterfeit by determining if an object's ID number conforms to the secret algorithm. Caution is required in order to prevent theft or discovery of the algorithm. Authorized ID numbers conform to the algorithm, but the algorithm itself is selected and/or used so that it does not readily allow easy discovery or reverse engineering of the originating algorithm. The algorithm must be kept secret so that it is not also used by unauthorized personnel.

However, if the secret algorithm were to be stolen or discovered (as a computer "hacker" might delight in doing) one may be worse off with the secret algorithm than without, because a false sense of security could have adverse consequences. Consider for example, what if someone unauthorized discovered the secret algorithm but thereafter kept this discovery a secret from those authorized to use the secret algorithm, so that there was no inkling that the secret had fallen into the wrong hands? Genuine objects authorized by the secret algorithm's ID numbers may then be more vulnerable and susceptible to being counterfeited than if traditional serial numbers had been used in the first place.

An encryption algorithmic technique used to calculate security codes is disclosed in Peter White's U.S. Pat. No. 4,630,201. White's invention concerns security for checks and other transactions involving money. White, uses a table of random numbers. The same table of random numbers is associated both with a portable transaction device and with a bank's central processor. For a check, for example, a random number is selected from the table in the transaction device and used to encode the dollar amount of the particular check using an encryption algorithm. The calculated result, a security code, is then put on the check. The authenticity of the security code on such a check may be verified, by recalculating the security code again, in the same manner, in the bank's central processor, and comparing the two security codes for a match.

SUMMARY OF THE INVENTION

The invention disclosed herein utilizes the underlying principle of uniqueness for counterfeit detection. In accordance with the invention, each genuine object is assigned a different authorized identifying code. Counterfeit is detected when incorrect, repeated or out-of-place ID numbers are found on objects. ID numbers which are associated with objects may be represented in normal alphanumeric characters or otherwise, such as OCR or MICR fonts of alphanumeric characters, decimal characters, or bar coded characters, etc., which are designed to be machine read, and may be visible or substantially transparent.

In particular, an object's identifying serial number may be appended with one or more distinct random portions, positioned to the right of the serial portion, for example, with or without a decimal point (or binary point if binary were being used) or positioned preceding the serial number, or the serial portion may be understood as including one or more random portions, etc.

A truncated security ID number, comprised of a distinct serial number portion and a first random portion, may be used, for example, on the outside of a product package, and a complete security ID number, with a second random portion along with the serial number and said first random portion, used inside a product's packaging (concealing the complete ID number from casual perusal) such as on a product's enclosed return warranty registration card. Each distinct random portion may include one or more randomly selected digits.

Objects of the invention disclosed herein are to protect proprietary product and document integrity, quality, reliability, safety, authenticity and the like, by creating hurdles for would-be counterfeiters, and thereby reducing or eliminating such illegal, dangerous and/or economically devastating activity.

In so far as counterfeiting may nonetheless persist, it is another object of this invention to reduce investigative and/or prosecution effort, by providing those pursuing and/or prosecuting counterfeiters with irrefutable evidence, such as products or documents with unauthorized ID numbers, and therefore undeniably counterfeit, so that such culprits can be stopped from foisting their bogus, and typically shoddy, goods on society, and from unfairly competing with more honest commerce.

Other objects of the invention are to improve counterfeit detection and/or deterrence, to apprehend and/or track criminals and/or deter crime.

In accomplishing the above and other objects, individually and in various combinations, the applicants devised coding in accordance with their inventions, particularly but not exclusively for bar codes.

In accomplishing certain of the above objects of the invention, applicants have expanded upon and improved the counterfeit detection techniques disclosed in their U.S. Pat. No. 4,814,589 and copending patent applications mentioned above. According to their invention, such techniques involve accountability, alone or in combination with techniques which make it difficult to copy visually detectable features, such as holograms. The invention may be applicable to almost all types of counterfeitable objects.

In accordance with one aspect of the invention, a method for identifying unauthorized objects is provided comprising: associating with each authorized object identifying information of which at least one portion has been randomly selected; storing said information aside from said association with said authorized objects; reading said information from an object being checked for authenticity; and, comparing said read information with said stored information to detect discrepancy therebetween, whereby an unauthorized object is identified.

In accordance with another aspect of the invention, a method for identifying unauthorized objects is provided comprising: associating identifying coded indicia with each authorized object, a portion of said code having been selected from a detectable series and at least one other portion having been randomly selected; storing said identifying code aside from said association with said authorized objects; reading said coded indicia from an object being checked for authenticity; and, comparing said read coded indicia with said stored identifying code to detect discrepancy therebetween, whereby an unauthorized object is identified.

In accordance with another aspect of the invention, a method for identifying unauthorized objects is provided comprising: on at least one less accessible location of each authorized object, associating identifying information therewith which includes at least two distinct randomly selected portions; on at least one other more accessible location of each authorized object, associating said identifying information therewith but omitting at least one said distinct portion; storing said identifying information with said at least two distinct portions aside from said associations with said authorized objects; reading identifying information from at least one of said locations associated with an object being checked for authenticity; and, comparing said read information with corresponding said stored information to detect one or more discrepancies therebetween, whereby an unauthorized object is identified.

In accordance with this aspect of the invention, said identifying information may be read from both said locations associated with an object being checked for authenticity; and, said read information from both said locations may be compared with corresponding portions of said stored information to detect one or more discrepancies therebetween, whereby an unauthorized object is identified.

In accordance with another aspect of the invention, a method for identifying unauthorized objects with outer covering, such as products with packaging, is provided comprising: on at least one location inside said covering of each authorized object, associating identifying information therewith which includes at least two distinct randomly selected portions; on at least one location on the outside of said covering of each authorized object, associating said identifying information therewith but omitting at least one said distinct portion; storing said information with said at least two distinct portions aside from said associations with said authorized objects; reading identifying information from at least one of said locations associated with an object being checked for authenticity; and, comparing said read information with corresponding said stored information to detect one or more discrepancies therebetween, whereby an unauthorized object is identified.

In accordance with this aspect of the invention, said identifying information may be read from both said locations associated with an object being checked for authenticity; and, said read information from both said locations may be compared with corresponding portions of said stored information to detect one or more discrepancies therebetween, whereby an unauthorized object is identified.

In accordance with another aspect of the invention, a method of designating an object as authorized is provided comprising: randomly selecting at least one digit; storing said digit with a serial number for said object; and, associating said serial number and digit with said object.

In accordance with another aspect of the invention, a method of designating an object as authorized is provided comprising: providing at least one digit that cannot be anticipated; storing said digit with a serial number for said object; and, associating said serial number and digit with said object.

In accordance with yet another aspect of the invention, a method of designating an object as authorized is provided comprising: randomly selecting at least two distinct digits; storing said two distinct digits with said authorized object's serial number; and, associating said serial number and one distinct digit of said two distinct digits with said object on the outer surface thereof; and, associating said serial number and said two distinct digits with said object inside the outer surface thereof.

In accordance with still another aspect of the invention, a method of designating an object as authorized is provided comprising: randomly selecting at least two distinct digits; storing said two distinct digits with said authorized object's serial number; and, associating said serial number and one distinct digit of said two distinct digits with said object on the outer surface thereof.

In accordance with this aspect of the invention, said serial number and said two distinct digits may be located inside said object's outer surface. Also in accordance with this aspect of the invention, said serial number and said two distinct digits located inside said object's outer surface may be associated with a return card for said object.

In connection with one or more objects of the invention or aspects of the invention described herein, said identifying information may include a plurality of randomly selected portions, and at least one said randomly selected portion may be concealed in a given condition of said object. e.g., when wrapped in its original packaging.

Also in connection with one or more objects of the invention or aspects of the invention described herein, said identifying information may be: machine readable, represented at least once in machine readable code elements, and/or, represented at least once in a bar code symbol, When said authorized objects with said associated identifying information in a bar code symbol also have UPC symbols associated therewith, said identifying information in a bar code symbol and said UPC symbol may be located near each other, and/or a reading from one of said symbols near each other is automatically delayed until said other symbol is also read in the same reading operation, and/or one bar code symbol is associated with said object, another possible bar code symbol not being near to said one, and said one bar code symbol is automatically read without undue delay in the reading operation due to anticipation of said another possible bar code symbol being near to said one, and/or said identifying information in a bar code symbol located near said UPC symbol may be substantially transparent, and/or said substantially transparent identifying information in a bar code symbol may be placed right over said UPC symbol.

Also in connection with one or more objects of the invention or aspects of the invention described herein, said read information may be checked to determine if the same identifying information was previously read from another similar object, whereby at least one of the objects with said same identifying information may be identified as an unauthorized object, and/or said same identifying information may be flagged or stored in a list to facilitate identification of additional possible unauthorized objects with said same identifying information, and/or a said object's read identifying information may be checked to see whether it has been previously flagged or stored in a list, whereby an unauthorized object may be identified.

Also in connection with one or more objects of the invention or aspects of the invention described herein, each said object may have associated therewith an other object which may be separated from said object and with which corresponding respective said identifying information having at least one randomly selected portion may be associated. Said other object may be a return card. Said corresponding identifying information may be read from a said return card and compared to said stored information to detect discrepancy, whereby an unauthorized return card may be identified.

Also in connection with one or more objects of the invention or aspects of the invention described herein, said identifying information associated with an authorized object may also include at least one other portion which has been selected in accord with a secret algorithm.

In accordance with yet another aspect of the invention, a system is provided for automatically detecting an unauthorized object, each authentic object having associated therewith authorized information of which at least one portion has been randomly selected, the system also comprising: means for storing said authorized information; means for reading information from an object; and, means for automatically detecting when said read information does not match up to said stored authorized information, whereby an unauthorized object is detected.

In accordance with another aspect of the invention, a system is provided for identifying an unauthorized object from a set of authorized objects, each authorized object of said set having identifying information associated therewith of which a portion has been calculated using an algorithm dependent on a randomly selected number, the system comprising: means for securely storing said randomly-selected numbers at a single location only; means for reading identifying information from an object: means coupled to receive said information read from said object for at least temporarily storing that information; and means for automatically detecting when information read from any object includes a different said portion than that calculated using said algorithm, whereby an unauthorized object is identified.

In accordance with another aspect of the invention, a system is provided for identifying an unauthorized object from a set of authorized objects, each authorized object of said set having identifying information associated therewith of which a portion has been calculated using an algorithm dependent on a randomly selected number, the system comprising: means for securely storing said identifying information, including said calculated portion, aside from said authorized object; means for reading identifying information from an object; means coupled to receive said information read from said object for at least temporarily storing that information; and means for automatically detecting when information read from any object includes a different said portion from said securely stored identifying information, whereby an unauthorized object is identified.

In connection with one or more objects of the invention or aspects of the invention described herein, means may be provided for automatically erasing randomly selected numbers for security purposes, and/or means may be provided for securely storing identifying information only at a single location aside from authorized objects, and/or means may be provided for automatically erasing a portion calculated using said algorithm after association with authorized objects.

In accordance with yet another aspect of the invention, a plurality of genuine essentially identical objects are provided, each having authorized identifying information associated therewith, the associated information being useful for indicating authenticity of each object, this information including a distinct serial number portion comprised of at least enough digits to uniquely identify each said object, and a second portion that cannot be anticipated, this second portion having at least one digit. This one digit may be randomly selected or result from a calculation using at least one randomly selected digit. Aside from association with said objects said information may be stored along with respective randomly selected digit(s) or second portions.

A system for indicating authenticity of such objects is also provided and it includes such objects and means for storing information aside from the association with objects, means for reading information from an object, means for comparing read information with stored information and finding a match therebetween, a match between read information and stored information indicating that the object with such read information is authentic.

In accordance with yet another aspect of the invention, a method of designating at least one of many essentially identical and identifiable objects as authorized is provided comprising: providing a serial number for one such object; and, providing a randomly selected number for this one object: using at least one digit of said serial number and at least one digit of said randomly selected number with an algorithm to calculate another number that cannot be anticipated for said object; and, associating at least one digit of said number that cannot be anticipated with said object.

In accordance with yet another aspect of the invention, a plurality of genuine essentially identical objects are provided, each having authorized identifying information associated therewith, this associated information being useful for indicating authenticity of each said object, and this information includes at least one digit that cannot be anticipated.

A system for indicating authenticity of such objects is also provided and it includes such objects and means for storing said information aside from said association with said objects; and, means for retrieving said stored information; and, means for reading information from an object; and, means for comparing said read information with said retrieved information and finding a match therebetween, a match indicating that said object with said read information is authentic.

Another system for indicating authenticity of such objects is also provided and it includes such objects and means for storing said identifying information aside from said association with said objects; and, means for storing other information related to said identifying information; and, means for retrieving said stored identifying information; and, means for retrieving said stored related information; and, means for reading information from an object; and, means for comparing said read information with a result of a calculation using said retrieved related information, and finding a match therebetween, a said match indicating that said object with said read information is authentic.

The invention and its background are described with particular reference to ID numbers, and bar coded ID numbers, in decimal, base ten, but which may be represented in any base such as binary, ternary, octal, decimal, base 43, etc. However, the invention has wider application and it is not intended to limit the scope of the invention by such references.

DESCRIPTION OF THE DRAWINGS

The invention is illustrated by way of example and not limitation in the figures of the accompanying drawings in which like references, if any, indicate like parts, and in which.

DETAILED DESCRIPTION

Figure 1:
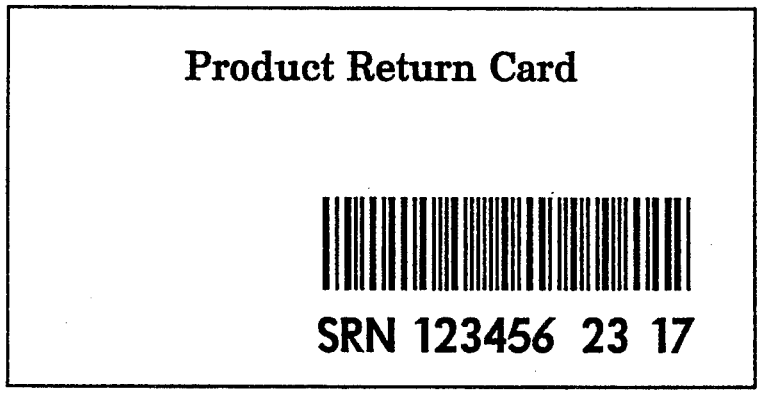
FIG. 1 is a plan view of a product return card with ID number indicia in decimal digits and in bar code. The product return card may be found inside a product package. The ID number indicia include two random portions, shown as 23 and 17.

Many products already include registration material, such as a blank name, address, where purchased form, printed on a return postcard on which may be found the product's ID number. Such cards are often used to activate a product's warranty.

Counterfeit products may be detected by looking for duplicate registration of normal serial numbers. However, this procedure leaves something to be desired, because counterfeit cannot be detected via the serial number until two (or more) of the same serial numbers are eventually registered, and even so, when two of the same serial numbers do turn up, an investigation must first be made to determine if one is genuine (as both may be fake) and if so, which one. Also, assuming a counterfeit product is positively detected and the vendor who sold the counterfeit product is identified by the product registrant, it may still be impossible, or cumbersome at best, to determine if other products in the vendor's stock are also counterfeit. Further, physical examination procedures would likely be "intrusive" and may render examined products unfit for retail sale.

In a way, these difficulties arise from the use of traditional serial numbers. Because traditional serial numbers are as orderly and convenient to use as possible, they are also completely and readily predictable, and thus are directly vulnerable and susceptible to being counterfeited.

Applicants' telling anti-counterfeit technique overcomes these short-comings: registration involving just one ID number on a counterfeit product can immediately and unmistakably be identified as fake, and even before a "lead" from the registration process, counterfeit products can be positively identified on the retail shelf or in mail order inventory warehouses or distribution channels, etc., without opening the product's packaging.

According to the invention, ID numbers include a serial portion and one or more random portions appended to, or associated with, the serial portion. Such D numbers have the serial portion in predefined digit positions, so that ID numbers may be used just as orderly and conveniently as traditional serial numbers. The serial number portion (which may be called the serial field) of the ID number is appended with one or more random portions (each random portion may be called a random field). Each random portion may contain one or more randomly selected digits. A random number generator may be used which may, e.g., randomly select digits based on cosmic noise. Required randomly selected numbers may be provided on-the-fly, as needed, and then stored if required or erased if not required. Or, required randomly selected numbers may be generated and stored in a list and the list then referred to as required. It may be useful for random portions to be separated from the serial portion by a decimal point, for example.

Security is enhanced because such complete authorized ID numbers are unpredictable as follows: if one decimal digit is randomly selected, only one in ten ID numbers would be predictable by a counterfeiter, and if two digits are randomly selected, only one in a hundred, etc. There is no secret code to be stolen or discovered. With applicants' random technique, the problems and worries described above for traditional serial numbers and ID numbering in accord with a secret algorithm are simply avoided.

For example, the serial random number (SRN) shown on the Product Return Card in FIG. 1 is:

123456 23 17

For example, this ID number, 123456 23 17, is associated with a genuine product. The first six digits of the ID number, 123456, comprise a traditional sequential serial number with sufficient range to uniquely identify one million genuine products, from 000000 to 999999. The next four digits, in this example 23 and 17 (shown throughout herein with separating spaces for clarity) are randomly selected, and stored in a file, such as a computer file, perhaps a file associated with a database system, along with the traditional serial number portion, to form a file listing of complete authorized ID numbers. In other words, aside from associating authorized ID numbers with authentic objects, authorized ID numbers are also stored separately, e.g., on a list stored in a computer file. Because of the serial portion, the list of complete authorized ID numbers is as orderly as can be, and because of the randomly selected parts, it is also unpredictable as described.

For example, when a product's ID number, e.g., 123456 23 17, is entered from the return card in a product registration system computer containing the listing of complete authorized ID numbers, the random digits can be checked automatically—if they do not all match those which were originally stored, a counterfeit product's unauthorized ID number is positively and immediately detected. The product registration system computer may also be used by investigators looking for counterfeit, without need for registration and/or return cards, as described below.

In this aspect, complete authorized ID numbers simply cannot be effectively predicted or anticipated without one-for-one copying from complete genuine ID numbers by the counterfeiter, which is prohibitive, or, at least severely limiting, creating a hurdle for the counterfeiter.

Figure 2:
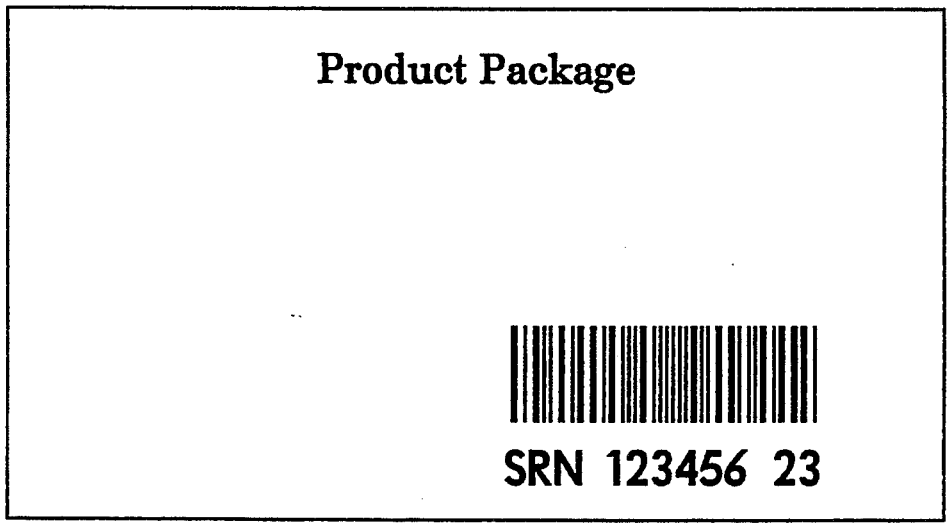
FIG. 2 is a side view of the outside of a product package with ID number indicia thereon corresponding in part to the ID number indicia on the product return card of FIG. 1.

Corresponding ID numbers, or preferably ID numbers corresponding only in part, may also be put on the outside of product packaging. The truncated serial random number (SRN), which corresponds in part to the ID number indicia shown in FIG. 1, is shown in FIG. 2 on the Product Package as:

123456 23

The reason for truncation is described below. Use of such ID numbers on the outside of product packaging makes them readily accessible, and allows a "shopping" service contracted by the product's manufacturer, or an investigator, to read and store bar coded ID numbers from products, e.g., on store shelves, and then send them, for example using a modem, to the manufacturer's system registration computer where the randomly selected portion of the ID numbers read from products can be checked against the stored list of complete authorized ID numbers, so that unauthorized ID numbers from counterfeit products may be detected. Thus, counterfeit products may be identified even before customer purchase, and authorities may be put on the trail of the perpetrators sooner. In enforcement proceedings, even good leads can get cold.

Or for example, applicants' counterfeit product detection system could be set up to include handheld devices that combine radio communication capability with bar code reading (e.g., the LRT 3800, which also includes portable computer terminal capabilities, in a handheld unit, a product of Symbol Technologies Inc., of Bohemia, N.Y.) so that counterfeit could be detected at about the speed of light while an investigator points the device at a product being checked for authenticity. For example, the LRT 3800 device reads and interprets the ID number bar code on a product that may be counterfeit, radio communicates this information to the product registration system computer to automatically check the ID number's random digit(s) to see if they match what was originally stored, and then receives back from the computer an indication if the ID number is unauthorized, thereby detecting counterfeit.

The type of equipment used by Federal Express delivery service may be adapted for applicants' counterfeit detection system. Federal Express uses bar code reading and communication devices, and sometimes a communication satellite, in a package tracking system (see Automatic ID News Vol. 7, #2, 2/91, pg. 16). With such devices working with a central anti-counterfeit computer system, for example, counterfeit could be detected quickly, on a shelf in a location being checked for having counterfeit product, at a U.S. border in a routine or special Customs inspection, and so forth.

If a counterfeit product with an unauthorized ID number did turn up in the registration process, a shopping service or an investigator could be dispatched directly to the location that sold the counterfeit and/or to this seller's supplier, to check for additional counterfeit products, without opening product packaging. Such investigation may be conducted covertly if there is suspicion that the vendor himself may be implicated. (Bar code readers with storage, for example, only the size of a credit card, are commonly available.)

With bar coded ID numbers on the outside of packages, investigative effort is reduced, and subsequent prosecution effort may be simplified, because prosecuting attorneys may have irrefutable evidence: e.g., product with an unauthorized ID number, and therefore counterfeit.

Dual Random

ID numbers located on the outside of packaging are more accessible than ID numbers located inside the packaging, and may therefore more readily allow the possibility of a counterfeiter acquiring authorized ID numbers from the outside of genuine product packaging than from the inside (this may not be a significant risk in all cases). For example, a counterfeiter might bribe someone in a distributor's shipping/receiving department to accumulate "outside" authorized ID numbers with a concealable bar code reader so that they could be used later on counterfeit products. if this happened, the manufacturer could be back where he started, looking for duplicates, suffering the shortcomings mentioned above, or perhaps even being worse off because of a false sense of security.

Applicants' anti-counterfeit invention anticipates this possibility. For example, the complete authorized ID number, 123456 23 17, is printed on the return registration card (as shown in FIG. 1) which is located inside the package and is therefore less accessible than the ID number located on the outside of packaging, thus concealing the complete authorized ID number from casual perusal. For example, if a product is in its original packaged condition, an ID number with associated random portions located inside the packaging would be concealed.

Only a truncated authorized ID number, 123456 23, is printed on the outside of the package (as shown in FIG. 2). Thus, even if a counterfeiter surreptitiously acquired outside ID numbers from product packaging, counterfeit products can still be detected immediately upon registration, and also with absolute certainty, and still without relying on the appearance of duplicate registration ID numbers.

If the first two random digits of inside ID numbers are correct, and only the last two random digits are wrong, the manufacturer need not go looking for incorrect outside ID numbers on any shelves, so to speak, because it is evident that the counterfeiter somehow acquired authorized (but truncated) outside ID numbers.

In this case the manufacturer is still not without help from the system computer, by which this discovered "leak" may be dealt with, and this now notorious counterfeiting ring broken. Indeed, it may well be possible to catch culprits "in the middle," by analyzing when the products with the copied outside ID numbers were manufactured and through what distribution channels they moved, as well as backtracking the source of the counterfeit product itself.

In an embodiment of applicants' invention, a list (e.g., a partial listing limited to specific ranges of serial numbers, and/or selected geographical and/or chronological parameters, etc.) of authorized outside ID numbers in the above example, 123456 23) might be supplied in a portable, noncommunicating unit to investigators for use in the field as described below. For increased security, perhaps specially trusted investigators only would be supplied with such "portable" lists, and/or such lists may only be supplied just prior to an investigation at a given location, and/or such lists may only be supplied in units that automatically erase the list after a given amount of time has elapsed and/or at a specified time, etc.

In any case, this embodiment is less of a security exposure than supplying complete ID numbers for use in the field, especially if only a limited, partial listing is provided. For example, even if a portable list was acquired and used by counterfeiters, more complete ID numbers, such as those from a return card, would still expose the crime.

For example, with portable lists counterfeit objects may be detected immediately, in the field, by comparing ID numbers read from a product's packaging directly against the list to determine if the correct random field for a respective serial number field is present on a product's package, without checking with the central computer where the master list of complete ID numbers is stored, on-site so to speak, no communications required, using a portable unit (much as checking a hot list, described below). Thus, increased convenience, effectiveness and cost saving (e.g., limited communication requirements) may be realized when looking for counterfeit, without undue security exposure.

Security Enhancements

Additional security enhancements are possible. For example, to prevent unauthorized copying of ID numbers, a return card's complete ID number, or just the random security part(s), may also be concealed, e.g., with latex covering, like the VIRN number (Void If Removed Number) on an instant lottery game ticket, or the ID number may only be represented on the card in a customized "secret" bar code format.

Variations are possible. For example, if the possibility of a counterfeiter acquiring outside ID numbers during distribution exists, and return cards are not appropriate for a given product line, several such products may be packed for shipping in a sealed carton concealing the products' outside ID numbers during distribution.

Also, outside ID numbers can be put on such cartons, and latex-covered return from the retail vendor cards can be put in the carton (but not inside individual product packaging).

And, as described below, the use of, e.g., 123456 17 instead of 123456 23 17 on a return card, adds security.

Four Random Fields

In another example, consider an ID number with four appended random fields:

123456_ 23 17 79 10

The blank digit position shown with an underline is described below. 123456 23 may be put on the outside of a shipping carton containing ten products. 123456 23 17 may be latex-covered and put on a return from the retail vendor card and located inside the carton, but not inside individual product packaging.

Ten ID numbers using 123456_ 23 17 79 may be used as follows, one on the outside of each product package:
1234560 23 17 79
1234561 23 17 79
1234562 23 17 79
1234563 23 17 79
1234564 23 17 79
1234565 23 17 79
1234566 23 17 79
1234567 23 17 79
1234568 23 17 79
1234569 23 17 79

Each may be applied to ten respective product package's outside. The additional digit in each of these ID numbers (in the seventh position from the left, shown underlined) uniquely identifies each of the ten products, for the batch serial number 123456, and may conveniently be considered as part of the serial number portion of the ID number for individual products. Each product may also have a return card inside its packaging, each with one of the following ID numbers:
1234560 23 17 79 10
1234561 23 17 79 10
1234562 23 17 79 10
1234563 23 17 79 10
1234564 23 17 79 10
1234565 23 17 79 10
1234566 23 17 79 10
1234567 23 17 79 10
1234568 23 17 79 10
1234569 23 17 79 10

If this type of embodiment were used, one risk is that a savvy counterfeiter obtaining one correct ID number from a return card, such as 1234567 23 17 79 10 in this example, might correctly deduce nine other authorized ID numbers, those others between: 1234560 23 17 79 10 and 1234569 23 17 79 10, inclusive.

Because of the difference in the number of digits in ID numbers for respective locations, when ID numbers are read it may readily be automatically determined by apparatus where that ID number was read from, whether from the outside of the carton of ten products, from inside the carton on the carton's return card, from on the outside of an individual product or from the return card inside the individual product package.

In the event of counterfeiting of authorized ID numbers such as these, knowledge of which random digits have been copied provides useful information, e.g., when and/or from where the ID numbers were copied. For example, if:

1234560 23 17 79 86

(and other similarly constructed ID numbers) were found on a counterfeit product, a counterfeiter learned correct ID numbers for three places: the outside of the carton, inside the carton, on the outside of an individual product, but not for the product's return card. This would indicate that the counterfeiter had access to the outside of the products' individual packaging for copying, since all random digits up to that point are correct.

However, in some embodiments it may be preferred to increase security. For example, additional security may be realized if the random fields are used more sparingly. For example, while 123456 23 may be used on the outside of the carton of ten products, only 123456 17 may be used on the carton's return card (instead of 123456 23 17). 1234560 79 (the first of ten similar ID numbers corresponding to the above) may be used on the outside of an individual product, and 1234560 10 (again, the first of ten) used on the return card inside an individual product package. Now, for example, knowledge of a valid ID number from the outside of an individual product, 1234560 79 in this example, does not inform of the corresponding random field for the outside of the carton of ten such products (23), or of the corresponding random field used inside the carton on the carton's return card (17). Thus, higher security is realized.

However, in this example of higher security, inquiries made in the system computer to check an ID number for authenticity, i.e., whether or not the random field digits are correct, would need to inform from where the ID numbers were read. For example, while 123456 23 is correct for the outside of a carton of ten products, 123456 17 is incorrect. 123456 17 read from the wrong location (the outside of a carton) would be an unauthorized ID number and indicate counterfeit.

In another embodiment, say the following ID number (with a sixteen digit serial field and five fields of two randomly selected digits each):

1234567812345678 23 17 79 10 55 were used for documents, for example, on U.S. currency. A file with the serial number portions and only the associated first random field, shown with 23 in this example, may be provided by the Bureau of Engraving and Printing to commercial banks for their general use in detecting counterfeit, a file of the random fields 23 17 provided to Federal Reserve Banks for their use, a file of the random fields 23 17 79 to the Treasury, FBI, CIA, etc., a file of the random fields 23 17 79 10 may be used exclusively by those most trusted in the Secret Service, and a file of all five random fields, 23 17 79 10 55 may be stored for safe keeping and used with extreme caution only if ever needed. In this manner, if sophisticated counterfeiting were to occur, authorities would know exactly where to start looking for culprits.

Bear in mind however, that currency with complete ID numbers would be in circulation, and complete correct ID numbers may therefore be copied one-for-one therefrom in large quantities over extended periods. But, if such sophisticated counterfeiting and preparation therefor was carefully committed over an extended period, archived currency flow information, as and if available, may reveal to authorities patterns of when and where authentic currency ID numbers copied from were situated in order for this copying to occur, thereby providing a possible lead for pursuers to follow.

Random and/or Secret Code

It may be useful in some counterfeit detection applications to provide ID numbers verifiable in some fashion in accord with a secret algorithm. For example, this may be accomplished according to applicants' invention as described above, i.e., to append to a serial number one or more distinct portions that conform to one or more respective secret codes. Such portions may be called secret code fields. In addition, random fields may or may not also be appended to the ID number.

In the first example, one secret code field is appended to the serial number (random fields are not used in this first example). The secret code field is represented by the ?? (the appended secret code field being undetermined thus far). The first example:

First example: 123456 ??

The second example uses two appended random fields (each random field has two randomly selected digits in these examples) and one appended secret code field (containing two digits that result from calculating a code in these examples) all three of which (fields) are used in a manner independent of each other. The secret code field is represented by the ?? (the appended secret code field being undetermined thus far). These three fields are shown in the second example as follows:

Second example: 123456 23 17 ??

The following technique may be employed to calculate the secret code field for both the first and second example. To the sum of the digits of the serial number portion add one, multiply by 541 and then divide by 11:

$$1+2+3+4+5+6=21+1=22\times541=11,902+11-\div1082.0000$$

Do not use the result-only use two digits, the two digits located on either side of the decimal point (2.0) in reverse order (02) in the secret code field. as shown for the first and second example:

First example: 123456 02

Second example: 123456 23 17 02

In this independent manner, knowledge of any random field (used in the second example only) is not required to use the algorithm on a serial number in order to calculate the secret code field to be appended thereto.

Say the secret code's algorithm required that the sum of the two digits of the first random field (shown as 2 and 3 in this second and third example) need also be added to the sum of the digits of the serial number portion, the complete secret code working for the third example as shown: Third example: 123456 23 17 ??

in this technique as described, according to this aspect of the invention, the serial number and the random number may be employed to calculate the secret code field for the third example as follows:

$$1+2+3+4+5+6+2+3=26+1=27\times541=14,60-7\div11=1327.9091$$

7.9 reversed, 97 would be the final result for the secret code field in the third example as shown:

Third example: 123456 23 17 97

In this third example, in a dependent manner, knowledge of both digits of the first random field is required to calculate the secret code field.

In this third example therefore, knowledge of the authorized random numbers of the first random field for respective serial numbers would be needed by those who may be anticipating verifying the secret code field of an ID number. While dissemination may tend to put the "sensitive" random information at (increased) risk of exposure, the use of random as described may also tend to increase the difficulty of breaking the secret code if the random information did not fall into the wrong hands (bear in mind any possible one-for-one copying as well).

The random digits used for calculating the secret algorithm need not be disseminated at all. The random digits used for calculating need not be put on the authorized objects themselves. Only some result of the secret algorithm calculation may be put on the authorized object and, according to the invention, the random digits required for the algorithm calculation stored only in the central computer, i.e., the random digits are stored in one location only. The advantage of this is reduced exposure of the random numbers, and increasing security for the secret code.

The fourth example following uses the same secret code algorithm as the third example, but the random field represented by 17 in the third example is not used at all, and the random field represented by the 23 in the third example is used in calculating the algorithm in the central computer but it (23) is not put on the authorized object. Thus, in this fourth example, serial numbers have only one respective random field which is only stored in the central computer and is not put on the object. The fourth example:

Fourth example: 123456 ??

The complete secret code employed in the central computer to calculate the secret code field for the fourth example is shown working as follows, the random digits, 23, being stored only in the central computer and retrieved for use when calculating the algorithm for serial number 123456:

$$1+2+3+4+5+6+2+3=26+1=27\times 541=14,60-7\div 11=1327.9091$$

7.9 reversed, 97 would be the final result for the secret code field in the fourth example as shown:

Fourth example: 123456 97

In a first embodiment of this fourth example, the algorithm may be calculated for authorization and the result put on the object being authorized, and calculated again for verification. In order to calculate again for verification, the random numbers need to be kept in storage to be used again in the calculation. In this case, the secret code field result of the calculation is put on the authorized object but need not be stored aside from the object. Therefore, in order to lessen exposure of sensitive information, means may be provided for automatically erasing the calculated secret code field results after being put on the authorized objects.

Or, in a second embodiment of this fourth example, when the algorithm is calculated for authorization and the result put on the object being authorized, the result could also be stored in the central computer, in association with the serial number, until needed again for verification of the authenticity of the object. In this second embodiment, verification then would work as follows: the serial number including the secret code field would be read from an object having its authenticity checked, and the reading compared in the central computer against the result that was previously calculated and stored for this serial number. A match indicates genuine.

Since the random numbers are not needed again for calculating in this second embodiment of the fourth example, the random numbers need not be kept in storage after the authorization process. If the secret code field result of the calculation is stored, random numbers need not be. The random numbers may be erased after the calculation. Advantage: risk of exposure of the random numbers is then eliminated and this would tend to increase the difficulty in breaking the code, as mentioned above. Also, if the random numbers required for this second embodiment of the fourth example were only provided on-the-fly, as needed for the calculation, and erased immediately after the required calculation is completed, security would be increased. For example, means may be provided to automatically erase the random numbers after the calculation.

Notwithstanding the above, even sensitive data may need to be securely protected for backup or archival purposes in a given computer application, to protect against loss of valuable information from possible hardware failures, such as a head crash on a hard drive, damaging dirt, power failure, operator error, theft, accident, war, acts of nature such as lightening, earthquake, etc. However, secured storage for backup or archival precautions should not be confused with dissemination of stored sensitive information (such as random information, secret code fields and secret algorithms) needed, for example, to verify ID numbers at more than one location. Such dissemination for expected use such as verification may tend to put sensitive information at increased risk of exposure, thereby increasing the possibility of sensitive information becoming available to counterfeiters.

According to applicants' invention, security is increased because authorization and verification is performed in only one location, and the random numbers and/or the secret code and/or the secret code fields need not be disseminated beyond this central system nor stored longer than needed (except that ID numbers, however they are constructed, are associated with the authentic objects they protect) and therefore the risk of exposure of the random information and/or the secret algorithm and/or the secret code fields is lessened.

In the fifth example following, everything works just like the fourth example but with one exception—a random field, shown as 17 in this example, is used independently as follows:

Fifth example: 123456 17 ??

In the fifth example, the secret field is calculated, and verification may be accomplished, just as described for the fourth example, storing the required random digits safely in one location (according to the first embodiment) or storing the secret code field in one location (according to the second embodiment).

In the fifth example, the random digits, 17, are put on the object and stored in the central computer as described previously. The fifth example's ID number is completed as follows:

Fifth example: 123456 17 97

In summary:
First example: 123456 ?? to 123456 02
Second example: 123456 23 17 ?? to 123456 23 17 02
Third example: 123456 23 17 ?? to 123456 23 17 97
Fourth example: 123456 ?? to 123456 97
Fifth example: 123456 17 ?? to 123456 17 97

In the first example, 123456 ??, the secret code is independent and random is not used at all. In the second example, 123456 23 17 ??, the secret code is used independently, and two random fields are used. In the third example, 123456 23 17 ??, the secret code is dependent on one random field (which is also put on the object) and one random field is independent of the secret code. In the fourth example, 123456 ??, the secret code is dependent on one random field but this random field is not put on the object; this random, or the secret code field, is stored in only one computer. In the fifth example, 123456 17 ??, the secret code is dependent on one random field but this random is not put on the object; the random, or the secret code field, is stored in only one computer, and one random field is independent of the secret code.

If a secret code is to be used with or without random in ways described above, special consideration need be given to the worry that the secret code might be broken. Perhaps the lesser exposure in this regard is when a secret code is used with random in a dependent manner as described for the fourth and fifth examples. The secret code might be particularly vulnerable in the first and second examples.

In some applications, the use of a secret code may add significant difficulty for counterfeiters, i.e., in addition to other requirements, a counterfeiter would require knowledge of the secret code and he would be required to operate this code in order to provide correct ID numbers for his fakes. Some counterfeiting may therefore be deterred.

In another example following, certain variations are described. One digit that cannot be anticipated is calculated using part of an object's six digit serial number and a random number. The random number is used in the calculation but it is not associated with the object in this example:

123456 ?

The serial number portion is 123456. The digit that cannot be anticipated is represented by the ? as this digit is so far unknown but it will be calculated below.

The following algorithm may be employed to calculate the digit that cannot be anticipated for this example. Referring to the serial number portion, 123456, from left to right, add the fourth digit (4) to the product of the fifth digit (5) times three, and to this sum add the product of the sixth digit (6) times seven. Divide this sum by a randomly selected number. For this example a one digit number is randomly selected: 9. The calculation as described is shown as follows:

$$4+(5\times3)=19+(6\times7)=61\div9=6.7777$$

Calculate to four places and do not round the fourth place to the right of the decimal point (as shown). Now add the digit to the left of the decimal point, 6, to the third digit to the right of the decimal point, 7, but round this third digit up before adding if the adjacent fourth digit is between five and nine inclusive. In this example then, the third digit to the right of the decimal point, 7, is rounded up to 8. Therefore, $6+8=14$. Now calculate the arithmetical complement of the digit located to the left of the decimal point, 4, as follows: $10-4=6$. Use this result for this example as shown:

123456 6

Thus, the serial number 123456 and the respective digit 6 may be used to designate one object among as many as 999,999 other essentially identical and identifiable objects in this example as authorized. For example, each such object may be identified by a respective ID number which includes a six digit serial number portion. And, because a random number is used in the calculation with part of the serial number, the resulting digit (6 in this example) cannot be anticipated.

In this example, the randomly selected digit for serial number 123456, 9, which is used in the calculation, may be stored and retrieved and used to recalculate the digit that cannot be anticipated (6) for verification. Or, the digit that cannot be anticipated, 6, can be stored (aside from being associated with the object) and retrieved for verification purposes without recalculating the algorithm.

Also, referring to the outside Product Package ID number shown in FIG. 2, 123456 23, a secret algorithm may also be used to provide a corresponding inside ID number, shown as, 123456 ??, which may be used, e.g., on a return card. For example, the serial number, 123456, and the random number, 23, may be used to calculate the secret code field for a corresponding inside ID number as shown for this example:

$$1+2+3+4+5+6+2+3=26+1=27\times541=14,60\text{-}7\div11=1327.9091$$

As above, 7.9 reversed, 97 would be the final result for the secret code field for the corresponding inside ID number shown for this example: 123456 97.

In applicants' techniques described above, multiple secret code fields, each using a different secret code convention, in various combinations with one or more random fields, may also be used to provide different levels of counterfeit resistant ID numbers.

Repeated ID Numbers

Applicants' preferred anti-counterfeit system also checks for repeated ID numbers (inside, outside, etc) as described in applicants' copending application Ser. No. 07/420,101, filed Oct. 11, 1989. This prevents the possibility of one or a few authorized ID numbers used over and over going undetected. Repeated authorized ID numbers may be found, as well as repeated incorrect ID numbers. For example, two or more similar objects may be located with the same correct (or the same incorrect) ID numbers.

Repeated ID numbers could be flagged in the system computer and put out on "hot" lists and automatically circulated to authorized investigators to allow "immediate" detection of each subsequent use, as described below. Or, for possible security reasons, it may be preferred to maintain hot lists only in the system computer. For example, a hot list of repeated valid ID numbers in New York may be useful to a counterfeiter in California, if, for example, California investigators did not have the hot list of repeated valid numbers that had been circulated to investigators in New York.

Notwithstanding, there is an advantage to authorities looking for repeated ID numbers (valid or invalid) when compared to looking for wrong ID numbers: circulating a hot list (of repeated numbers) to investigators in the field (perhaps loading the hot list into Symbol Technologies' LRT 3800 unit mentioned above) is certainly less of a security exposure than circulating the master list of stored complete ID numbers in the field. The hot list of repeated numbers may be used relatively safely by investigators in the field when helpful for pursuing counterfeiters. For example, counterfeit objects may be detected in the field, without checking with the central computer where the master list of ID numbers is stored, on-site so to speak, no communications required, using a portable handheld unit.

The more often authorized ID numbers are repeated by counterfeiters, the smaller the sampling required by authorities to detect these counterfeits, advantageously allowing hot lists to be created sooner rather than later, and circulated to investigators. The worst case for authorities is one-for-one copying only. If counterfeiters were able to do, and only did, one-for-one copying, authorities then would have much the same difficulty as in finding two and only two objects with the same serial number. However, with applicants' anti-counterfeit system in place, this too is possible given time.

Modifications And Other Embodiments

Complete product distribution and shipment history may also be associated with applicants' anti-counterfeit system computer, and augmented with the registration process, so that, for example, any products reported stolen (prior to being sold to the public) may be flagged and backtracked to apprehend the culprits when the stolen products are ultimately registered. Product distribution information, along with registration information, may also be useful for marketing, accounting, inventory, automation control, quality control, and other purposes.

Applicants' anti-counterfeit systems may be augmented and/or adapted for use to also detect product diversion, or gray marketing, as well as control problems with returns and seasonally packaged goods, product recalls for defects or tampered-with goods, etc.

For example, consider the Tylenol, or the more recent, Sudafed cyanide deaths. Had these medicine products been identified with an ID number, perhaps the individual ID numbers of the poisoned products might have been helpful to authorities (even if counterfeit was not involved). For example, had the murderer purchased the Sudafed at a retail store, poisoned the Sudafed, and then put the deadly medicine back on a retail shelf, but in a different retail store, this modus operandi might have been detected. Authorities might then reasonably have ruled out a manufacturing inside job. While batch numbers of the poisoned products were helpful to authorities, ID numbers would have provided more detailed information.

The U.S. Customs Service plays a large part in detecting counterfeit products at our nation's borders. In a preferred embodiment, applicants suggest that all companies should adopt uniform self-identifying bar code standards, of the type described in Table 1 (note Format F, 101, on Table 1, "Product or document 'Seal of Authenticity' service") and described in applicants' co-pending application Ser. No. 07/420,101, filed Oct. 11, 1989, and should use common communication facilities and common counterfeit product computer system facilities. This would allow convenient means, for example, for U.S. Custom agents, as well as other investigators, to use the same bar code reading devices to check a variety of products for authenticity.

TABLE 1

Uniform Bar Code Standard Specifications Using Binary Coded Binary ™, BCB ™

| Format | General Format Description |
| --- | --- |
| A: 000 | Emulation of Code 39's character set of 43 alphanumeric characters, both without and with data indentifiers as specified by FACT, including BCB efficiency and versatility enhancements. |
| B: 001 | Numerical information only, represented in Binary arithmetic. |
| C: 010 | Reserved for paper currency, including U.S. and foreign currency. |
| D: 011 | Alphanumeric, the full ASCII set of 128 (256?) characters, functions, etc., as specified by ANSI, using seven (eight?) BCB digit "words." |
| E: 100 | Emulation of all EAN & UPC symbols, but with enhancements. |
| F: 101 | Product or document "Seal of Authenticity" service. |
| G: 110 | User defined. |
| H: 111 | Other universal unified BCB bar code symbologies defined by a second set of three format bits which are adjacent to the first set of three format bits. |

Products using these common standards and facilities might be identified with an associated "Seal of Authenticity." Also, some value may be had for example, if this Seal were a hologram, as described in applicants' co-pending application Ser. No. 07/420,101, or made with some other demanding printing technique, such as a detailed engraving. Or, as opposed to putting a "Seal of Authenticity" label on a product, the Seal may be printed along with other product packaging printing.

A "Seal of Authenticity" and/or the addition of a product return card to confirm authenticity might become part of a product's enhanced, and thus more desirable, image, as well as an integral part of a product's marketing strategy.

Another consideration here is the deterrent effect visible or invisible security ID number indicia may have, in possible association with a "Seal of Authenticity," on a would-be counterfeiter. There may be desirable effect, for example, to use prominently placed "Seals of Authenticity" on protected products, in association with advertising in strategically selected media of "ominous invisible high-tech fool-proof intellectual counterfeit-detecting bar coded security ID number indicium, positive protection with the absolute certainty of random counterfeit control that simply cannot be anticipated."

Dual Bar Code Mode of Operation

Figure 3:
FIG. 3 is a side view of the outside of a product package with ID number indicia thereon corresponding in part to the ID number indicia on the product return card of FIG. 1. Also located on this same outside side near said ID number indicia is a standard UPC bar code symbol.
Figure 3:

It may be efficient or otherwise desirable in some applications of applicants' invention, and for other purposes as well, to place two bar code symbols near each other. For example, it may be useful, where product packaging is printed with standard UPC bar code symbols, to place ID number indicia, such as shown in FIG. 2, on the same side of a product's packaging as the standard UPC bar code symbol, in convenient proximity thereto or association therewith, as shown in FIG. 3. For example, referring to FIG. 3, a truncated bar coded ID number is placed near the standard UPC bar code symbol, to the left of it with ⅜ inch of white space in-between.

Coincidentally, the UPC symbol shown to the right of the security ID number in FIG. 3 is a photo reproduction of an actual UPC symbol from a product called Vistatector, which is a pen-like device that can detect counterfeit currency or other counterfeit documents, a product of a New York City company, Vistatech Enterprises, Limited.

For example, locating two distinct bar code symbols near each other, such as a product's ID number and its UPC symbol, allows the possibility of an investigator reading the ID number in association with the UPC symbol, in the same reading or scanning operation, so that the product under scrutiny can be identified in accord with standard UPC product assignment coding, and individually identified for authenticity purposes with the ID number as described above.

In addition to convenience, this may allow smaller ID number indicia on packaging to be sufficient, since general product identification may be made via the UPC symbol, and/or this may be helpful by automatically informing authenticity apparatus what kind of product is being scrutinized.

Figure 4:
FIG. 4 is a view of a product package with transparent or invisible to the naked eye ID number information and a standard UPC bar code symbol superimposed relative to each other.

It may be efficient or otherwise desirable in some applications of applicants' invention to make ID number indicia, such as shown in FIG. 2, or perhaps only the bar coded indicium of FIG. 2, substantially transparent, effectively invisible. Dolash et al.'s U.S. Pat. No. 4,983,817 describes how substantially transparent bar codes may be accurately read even though placed on top of visible printed text or even placed on top of a visible bar code symbol. For example, a bar coded ID number may be printed in invisible ink directly over a standard UPC symbol on a product's packaging, or in convenient proximity therewith, as shown in FIG. 4 where the invisible ink (or transparent) bar code is represented by a broken-line block.

If placed directly over a standard UPC symbol on a product's packaging, space dedicated on the packaging only for the ID number bar code symbol is not required, allowing more space for marketing purposes, without the distraction of another (visible) bar code. Another potential advantage is that both the UPC symbol and the bar coded ID number may then be scanned together, in one operation, automatically, as described below.

Or, as may be understood from Dolash et al., scanning is facilitated if an invisible bar code is printed on an otherwise blank space. If an invisible ID number were placed in an otherwise blank space, in convenient proximity with the UPC symbol, say, directly to the left of it, the invisible ID number in what appears to be a blank space would offer little distraction while allowing it to be conveniently scanned, although invisible, along with the UPC symbol, because bar code scanning operators could be taught to scan the blank space to the left of the UPC symbol. (For example, to understand this, imagine the bar coded ID number in FIG. 3 to the left of the UPC symbol to be invisible, so that the space the ID number now occupies appears blank to a person's eyes.)

An operator could be prompted by scanning apparatus if an invisible ID number has not been read while such apparatus is in certain selected modes of operation. For example, one mode of operation (referred to as a "dual mode setting") of bar code scanning apparatus may require that two different bar code symbols (i.e., each individual symbol is complete unto itself and each can be read separately) such as a visible UPC symbol and an invisible ID number (either superimposed over the visible UPC symbol or just placed near the visible UPC symbol) or a visible UPC symbol and a visible ID number (as shown in FIG. 3) be successfully read before indicating a reading operation has been completed.

Typically, for human operators, an audible beep and/or the lighting of an indicator light are often generated at the end of each bar code reading operation in order to indicate completion thereof. According to applicants' dual mode setting for reading bar codes, a signal indicating completion of the bar code reading operation would not be provided until both a visible UPC symbol and an invisible ID number (in one example) have been successfully read, i.e., a reading from one bar code symbol located near a second symbol is automatically delayed until the second is also read in the same reading operation or cycle (e.g., as ended with an associated beep).

The dual mode setting for reading bar codes may operate as follows: when a mode selector switch is set to the dual mode position, the switch could clamp the signal that would normally indicate the completion of one bar code reading until a second signal indicates the completion of a second reading of another bar code symbol. Then, with both signals present, each indicating a completed reading of a respective bar code symbol, the clamp may be lifted (unclamped) allowing the beep to sound and/or the indicator light to be lighted, thus indicating that both bar code symbols had been read in this dual mode setting. Other operations could also be accomplished before an indication of the end of a reading operation, e.g., price look-up, inventory list augmentation, authenticity check, date check, comparison to lists of ID numbers being sought by enforcement authorities, etc.)

The dual mode setting operation may be used with bar code reading apparatus even if human operators are not involved in the bar code reading operation. For example, a signal indicating completion would not be provided to associated circuits (as would normally be done after one bar code symbol was read) until two symbols were read.

The mode setting switch on bar code reading apparatus may select applicants' dual mode setting, and perhaps other settings as well, such as a single mode setting that anticipates a reading where only one bar code symbol per reading operation is present. For example, a setting where only the one UPC symbol will be read even if an invisible bar code is on top of it.

Automatic Dual Mode

In addition to the dual mode setting for bar code reading apparatus described above, it may be useful to also provide an "automatic dual mode setting" which would automatically detect whether one bar code symbol only was present in a relevant area, such as one side of a product being scanned, or whether two bar code symbols located near each other were present.

For example, if some supermarket products were protected against being counterfeited, as described above, with a transparent bar coded ID number superimposed over the standard UPC symbol, and some supermarket products were not protected, and therefore had only one UPC symbol present, applicants' automatic dual mode setting on check-out line scanning apparatus would allow reading both symbols when two are present on a protected product and one symbol when only one is present, no matter in what order various products are checked out, automatically, without undue delay.

Another example for use of applicants' automatic dual mode setting as described above would be for invisibly bar coded last-day-of-sale dates superimposed over the UPC code of supermarket products that require date stamping, like most milk or medicine products. Other products do not require any date stamping, like paper or plastic products.

Also, an invisible ID number symbol placed over a product's UPC symbol, for counterfeit detection purposes, can be used for detecting expired product. For example, the date of the last-day-of-sale for limited shelf-life products may be stored in a supermarket's computer in association with ID numbers. For example, the expiration date for ID number bearing, Baby Safe Formula product, 3/21/91, may be stored in the computer along with the information that the 3/21/91 expiration date applies to Baby Safe Formula with ID numbers (serial portion only) 1,000,000 to 1,001,000.

Then, when ID numbers from Baby Safe Formula are read at a check out counter and sent to the supermarket's computer, their expiration dates may be looked up, and/or authenticity may be checked (in real time or in a nocturnal batch processing operation, using the common communication and counterfeit product computer system facilities mentioned above) and/or various lists may be checked (price, inventory, stolen goods, counterfeit with repeated ID numbers, contaminated goods, etc.) etc.

If two bar code symbols were present, two bar code readings would be completed before the beep sounds and/or the indicator light lights, etc., indicating that both bar code symbols have been read. But if only one bar code symbol was present the beep would sound and/or the indicator light would light, etc., without undue delay, if any delay, after only one symbol has been read, i.e., one bar code symbol is automatically read without undue delay in the reading operation due to anticipation of another possible bar code symbol being near.

Also, it may be desirable to indicate whether one symbol or two different symbols have in fact been read. For example, when two bar code symbols are read, sound two beeps ("beep,beep" as opposed to "beep") and/or double blink the light repeatedly (blink,blink, pause, blink,blink, pause, blink,blink, ...) or light two lights or use colored lights, etc.

An automatic dual mode setting on bar code scanning apparatus is first described for one visible and one invisible bar code symbol, using a visible UPC symbol and an invisible ID number. For example, when reading UPC symbols in a visible nonluminescent frequency band, a bar code reading device could also sense for other bar code structure, as it senses for the UPC symbol. Sensing for this other bar code structure, of say, just a few bars and spaces, could be performed in a second invisible luminescent frequency band—that reflected by an invisible bar code. For example, Dolash et al.'s U.S. Pat. No. 4,983,817 describes dual bar code detection means for reading two differing frequency bands, comprising optical filters, collection optics, light detectors, etc.

If what appears to be part of an invisible bar code (e.g., a few bars and spaces) in this second band is in fact sensed in association with a UPC reading, the signal indicating completion of the bar code reading operation would not be provided until both the visible UPC symbol and the invisible ID number have been successfully read.

And vice verse. For example, if what appears to be part of a visible bar code in a nonluminescent frequency band is in fact sensed in association with an invisible reading in a second luminescent frequency band, the signal indicating completion of the invisible bar code reading operation would not be provided until both have been successfully read.

With additional provided means, a similar approach could be used if both bar codes were visible and placed near each other, as shown in FIG. 3. For example, if a few dark bars and a few light spaces are sensed in the proximity of another bar code symbol being read, the signal indicating completion of the bar code reading operation would not be provided until both visible bar code symbols have been successfully read.

There is a distinction, however, between sensing two bar code symbols when one (invisible) bar code is superimposed on the other, and reading two bar codes that are merely near each other (either both visible as shown in FIG. 3 or one visible next to one that is invisible). If a first symbol is superimposed on a second in a certain manner, so that it is not possible to miss scanning at least part of the first symbol before reading the second symbol completely, both symbols would always be read in the automatic dual mode setting of scanning apparatus. For example, the invisible superimposed bar code may be made at least as tall as the the UPC symbol underneath, and placed so that it spans at least part of this UPC symbol completely from top to bottom. Thus, at least part of the first invisible bar code symbol cannot be missed while reading the complete second visible symbol.

However, for example, referring to FIG. 3 where one visible bar code symbol is located next to another as shown: if during a reading operation with scanning apparatus set in automatic dual mode setting, scan lines came from the right and encountered the complete UPC symbol of FIG. 3 without going sufficiently past to also encounter part of the ID number symbol to the left (the normal required quiet zone for the bar code symbols described in these examples is understood to be $\frac{1}{4}$ inch or less) a reading of only the UPC symbol may be provided along with a beep indicating completion of the reading operation even though two symbols are present next to each other and should be read together.

An example of a solution to this problem, where only one symbol is read when two are present near each other for reading together, is described. Scanning apparatus with automatic dual mode setting may be adjusted to work as follows: in automatic dual mode position the scan lines always go past the first bar code symbol encountered at least a fixed amount of, say effectively, $\frac{1}{2}$ inch distance (this $\frac{1}{2}$ inch being greater than what would otherwise be required for the quiet zone, as described). For example. referring back to FIG. 3, if during an automatic dual mode setting reading operation, scan lines came from the right and encountered the complete UPC symbol, the scan lines would continue at least $\frac{1}{2}$ inch past the left end of the UPC symbol, traversing past the complete $\frac{3}{8}$ inch space shown in FIG. 3, so that at least $\frac{1}{8}$ inch part of the ID number symbol to the left of the UPC symbol is also encountered.

if no bars and spaces are encountered past the left end of the UPC symbol for the $\frac{1}{2}$ inch of travel, apparatus proceeds on the basis that only the one UPC bar code symbol is present. For example, if scanning apparatus finds $\frac{1}{2}$ inch of white space blank, the UPC code reading is provided and a beep would sound (once) and/or the indicator light would light (without blinking) after only one UPC symbol has been read, without undue pause.

In anticipation of the scanning ½ inch past the first bar code encountered requirement of apparatus with an automatic dual mode setting, printing specifications are made for putting two bar code symbols near each other as follows: the distance between two such symbols may be between ¼ to ⅜ inch (⅜ inch is shown in FIG. 3) thereby insuring that the scan lines will always see at least ⅛ inch part of a second bar code symbol if present. Thus, in the automatic dual mode setting of scanning apparatus, when two symbols are near each other as specified, both will be read.

In order to avoid possible delay, care may also be taken when printing single bar code symbols (that may be read singly in an automatic dual mode setting) to either use a quiet zone of ½ inch minimum or not to use printing text or other material within ½ inch that might be interpreted as a few bars and spaces. If, for example, text were printed ¼ inch from one UPC symbol, and this text were interpreted to be a few bars and spaces in automatic dual mode setting, delay may result from looking for another symbol (which is not present).

A scan line skewing effect is possible, similar to what may cause a short read [short reads may occur when a skewed scan line leaves or enters a symbol other than at the end(s) of the symbol]so that, still referring to FIG. 3, the ID number symbol may be missed by skewed scan lines reading the UPC symbol, or, in the example shown in FIG. 3, missed by high or low sufficiently horizontal scan lines because the ID number symbol is shown shorter (smaller) than the UPC symbol on both top and bottom.

To avoid this, the ID number symbol may be made taller than shown in FIG. 3, tall enough to extend above and below the UPC symbol, tall enough so that at least part of the top or bottom of the tall ID number symbol "catches" these skewed scan lines, to avoid the ID number symbol being missed altogether (only the part of the ID number symbol closest to the UPC symbol actually need be so tall). Or, the two symbols of FIG. 3 could be made the same height and placed in vertical alignment next to each other (i.e., both sitting on the same horizontal line and both rising to the same height therefrom) and bearer bars used across their tops and bottoms spanning the ¼ inch to the ⅜ inch space in-between. As may be understood, the space between the two symbols cannot be too wide, i.e., greater than ⅜ inch in the above example (bearer bars are described in the applicants' copending application Ser. No. 07/420,101).

Because scan lines may be skewed, the ½ inch distance that the scan lines go past the first bar code symbol encountered (as mentioned above) may need to be increased, perhaps to ¾ or 1 inch, depending on other specifications, angles, etc. And, if the in-between space were ¼ inch, not ⅜, the ½ inch distance may suffice.

Also, if accepted standard conventions regarding the quiet zones of two symbols that are to be located near each other are modified, then part of an adjacent symbol, such as a few bars and spaces, might be handled as described above, and the two symbols read even though they are in what might otherwise be each other's quiet zone.

If scanning lines encounter only one bar code symbol in the automatic dual mode setting position of scanning apparatus notwithstanding the above possible superimpositions, distances, adjustments, specifications, etc., said one bar code symbol would be read and the beep would sound (once) and/or the indicator light would light (without blinking) after only one symbol has been read, with no undue delay, if any delay at all, in the reading operation due to anticipation of another possible bar code symbol being near.

Some delay might be caused and/or operator time wasted, for example, if a bar code scanning operator had to inform his apparatus whether one or two bar code symbols were to be read in a given reading operation, or, for example, if apparatus had to scan an area somewhat exhaustively to determine if one or two distinct bar code symbols were present before coming to the end of a given reading operation, when only one was present.

According to applicants' invention, another method may be used to automatically determine whether only one bar code symbol was present in a relevant area being scanned, or whether two bar code symbols located near each other were present. Referring yet again to FIG. 3 by way of example, there is one ID number bar code symbol to the left near one UPC bar code symbol. For example, in a selected automatic dual mode of operation, bar code scanning apparatus could always sense for the presence of a UPC symbol, and when a UPC symbol is read, look up this particular UPC symbol in a computer listing (the price associated with each UPC symbol, for example, for milk, medicine and paper products, is looked up in a computer) to check the "invisible bar code also?" flag which, depending if this flag is on or off, automatically informs apparatus whether or not another bar code should also be read along with this UPC symbol. In other words, the computer stores the information for each UPC code that may be read, as to whether or not another bar code symbol should be present and should also be read. Also, more than one flag could be used, in order to inform, e.g., which other particular bar code symbol(s) should be present and should be read, or, if more than one, which one(s) should be read, etc.

Another way of automatically informing bar code scanning apparatus whether one or two bar code symbols should be read in a given reading operation is, referring back to Table 1 on page 31, to assign another distinct format, e.g., Format X (not shown). Convention for using this format is that Format X BCB bar code symbols also require that, for example, whenever a BCB Format X symbol is read, a Code 39 symbol located near should also be read in a given reading operation. In other words, the particular bar code symbol itself may, by convention, inform whether one or two bar code symbols should be read in a given reading operation.

Another example of this aspect of applicants' invention, with UPC convention, would be to assign one or more UPC Number System. Characters, e.g., 1, 6, 7, 8 or 9, which were "Reserved for uses unidentified at this time," i.e., reserved when UPC conventions were adopted, to inform whether one UPC symbol or one UPC symbol and at least another bar code symbol should also be read in a given reading operation.

Certain changes and modifications of the embodiments of the invention disclosed herein will be readily apparent to those skilled in the art. It is the applicants' intention to cover by the claims all such uses of the invention and all those changes and modifications which could be made to the embodiments of the invention as herein chosen for the purpose of disclosure, without departing from the spirit and scope of the invention.

What is claimed is:

1. A method for identifying unauthorized objects comprising:
   on at least one less accessible location of each authorized object associating identifying information therewith which includes at least two distinct randomly selected portions;
   on at least one other more accessible location of each authorized object associating said identifying information therewith but omitting at least one said distinct portion;
   storing said identifying information with said at least two distinct portions aside from said associations with said authorized objects;
   reading identifying information from at least one of said locations associated with an object being checked for authenticity;
   comparing said read information with corresponding said stored information to detect one or more discrepancies therebetween, whereby an unauthorized object is identified.

2. A method for identifying unauthorized objects comprising:
   on at least one less accessible location of each authorized object associating identifying information therewith which includes at least two distinct randomly selected portions;
   in at least one other more accessible location of each authorized object associating said identifying information therewith but omitting at least one said distinct portion;
   storing said information with said at least two distinct portions aside from said associations with said authorized objects;
   reading identifying information from said one other more accessible location associated with an object being checked for authenticity;
   comparing said read information from said one other more accessible location with corresponding said stored information to detect discrepancy therebetween, whereby an unauthorized object is identified;
   reading identifying information including said at least two distinct portions from said at least one less accessible location associated with an object being checked for authenticity;
   comparing said read information from said at least one less accessible location with corresponding portions of said stored information to detect one or more discrepancies therebetween, whereby an unauthorized object is identified.

3. A method for identifying unauthorized objects with outer covering, such as products with packaging, comprising:
   on at least one location inside said covering of each authorized object associating identifying information therewith which includes at least two distinct randomly selected portions;
   on at least one location on the outside of said covering of each authorized object associating said identifying information therewith but omitting at least one said distinct portion;
   storing said information with said at least two distinct portions aside from said associations with said authorized objects;
   reading identifying information from at least one of said locations associated with an object being checked for authenticity;
   comparing said read information with corresponding said stored information to detect one or more discrepancies therebetween, whereby an unauthorized object is identified.

4. A method for identifying unauthorized objects with outer covering, such as products with packaging, comprising:
   on at least one location inside said covering of each authorized object associating identifying information therewith which includes at least two distinct randomly selected portions;
   on at least one location on the outside of said covering of each authorized object associating said identifying information therewith but omitting at least one said distinct portion;
   storing said information with said at least two distinct portions aside from said associations with said authorized objects;
   reading identifying information from at least one location on the outside of an object being checked for authenticity;
   comparing said read information from said outside location with corresponding said stored information to detect discrepancy therebetween, whereby an unauthorized object is identified;
   reading identifying information including at least two said distinct portions from at least one inside location of an object being checked for authenticity;
   comparing said read information from said inside location with corresponding said stored information to detect one or more discrepancies therebetween, whereby an unauthorized object is identified.

5. A method of designating an object as authorized comprising:
   randomly selecting at least two distinct digits;
   storing said two distinct digits with said authorized object's serial number; and,
   associating said serial number and one distinct digit of said two distinct digits with said object on the outer surface thereof; and,
   associating said serial number and said two distinct digits with said object inside the outer surface thereof.

6. A method of designating an object as authorized comprising:
   randomly selecting at least two distinct digits;
   storing said two distinct digits with said authorized object's serial number; and,
   associating said serial number and one distinct digit of said two distinct digits with said object on the outer surface thereof.

7. The method according to claim 6 wherein said serial number and said two distinct digits are located inside said object's outer surface.

8. The method according to claim 7 wherein said serial number and said two distinct digits located inside said object's outer surface are associated with a return card for said object.

9. A system for identifying an unauthorized object from a set of authorized objects, each authorized object of said set having identifying information associated therewith of which a portion has been calculated using an algorithm dependent on a randomly selected number, the system comprising:

means for securely storing said randomly-selected numbers at a single location only;

means for reading identifying information from an object;

means coupled to receive said information read from said object for at least temporarily storing that information; and means for automatically detecting when information read from any object includes a different said portion than that calculated using said algorithm, whereby an unauthorized object is identified.

10. The system according to claim 9, also comprising means for automatically erasing said portion calculated using said algorithm after said association with said authorized object.

11. A method for identifying unauthorized objects comprising:

associating with each authorized object identifying information which includes a plurality of randomly selected portions, at least one said randomly selected portion being concealed in a given condition of said objects and at least one said randomly selected portion being visible in said given condition of said object;

storing said information aside from said association with said authorized objects;

reading said information from an object being checked for authenticity; and comparing said read information with said stored information to detect discrepancy therebetween, whereby an unauthorized object is identified.

* * * * *